# United States Patent [19]

Nagai

[11] Patent Number: 5,640,499
[45] Date of Patent: Jun. 17, 1997

[54] METHOD OF EDITING A DRAWING DISPLAYED ON A DISPLAY UNIT OF A COMPUTER BY SIMULTANEOUSLY MOVING PLURAL ELEMENTS INCLUDED IN AN EDITING AREA

[75] Inventor: Sachiko Nagai, Fussa, Japan

[73] Assignee: Casio Computer Co., Ltd., Tokyo, Japan

[21] Appl. No.: 625,838

[22] Filed: Apr. 1, 1996

Related U.S. Application Data

[63] Continuation of Ser. No. 140,577, Oct. 21, 1993.

[30] Foreign Application Priority Data

Dec. 9, 1992 [JP] Japan ................................ 4-351602

[51] Int. Cl.$^6$ .................................................. G06F 15/00
[52] U.S. Cl. .......................... 395/133; 395/137; 395/138; 395/919; 395/964
[58] Field of Search .................................. 395/133–139, 395/155–161, 162

[56] References Cited

U.S. PATENT DOCUMENTS

| | | | |
|---|---|---|---|
| 4,663,616 | 5/1987 | Christensen | 395/133 |
| 4,829,446 | 5/1989 | Oraney | 395/133 |
| 4,974,174 | 11/1990 | Kleinman | 395/133 |
| 5,341,465 | 8/1994 | Goto | 395/134 |
| 5,379,372 | 1/1995 | Wu | 395/155 |

*Primary Examiner*—Mark R. Powell
*Assistant Examiner*—U. Chauhan
*Attorney, Agent, or Firm*—Frishauf, Holtz, Goodman, Langer & Chick

[57] ABSTRACT

A drawing which is drawn on a personal computer includes plural drawing elements and is displayed on a display unit of the personal computer. An editing area and a location to which the editing area is moved are specified by means of a pointing device such as a mouse. Coordinates of the editing area are stored in an area memory. A relative moving distance is calculated from coordinates of the specified location. The calculated relative moving distance is stored in a moving distance memory. A coordinate changing process is effected using data stored in the area memory and the moving distance memory. In the coordinate changing process, it is judged whether individual drawing elements are located inside the editing area. The drawing element which is located inside the editing area is subjected to a moving process. When a drawing element is located across a boundary of the editing area, only a part of the drawing element that is located inside the editing area is moved to the specified location.

11 Claims, 6 Drawing Sheets

METHOD OF EDITING A DRAWING DISPLAYED ON A DISPLAY UNIT OF A COMPUTER BY SIMULTANEOUSLY MOVING PLURAL ELEMENTS INCLUDED IN AN EDITING AREA

This application is a continuation of application Ser. No. 08/140,577, filed Oct. 21, 1993.

BACKGROUND OF THE INVENTION

1. Field of the Invention

The present invention relates to a method of editing a figure or a drawing, which is drawn by means of a personal computer and is displayed on a display unit of the computer. The displayed drawings such as a map, a flow chart or a block diagram comprise a plurality of drawing elements. Drawing elements of the drawing to be edited comprise, for example, straight lines, curved lines, circles, circular arcs, rectangles and so on. According to the editing method of the present invention, drawing elements of the drawing which are designated by an editing area are edited such that lines included in the drawing elements are not left broken in the edited drawing.

2. Description of the Prior Art

Computer programs for drawing figures or pictures on a personal computer are well known. Further, it is known that a picture drawing apparatus for drawing pictures is available as one of the functions of a conventional word processing machine.

Figure 8A:
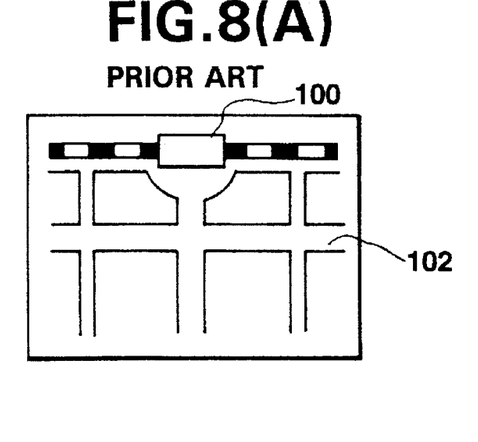
FIGS. 8(A)–8(E) are views illustrating a drawback of the prior art.

For example, a map such as shown in FIG. 8(A) can be drawn by the picture drawing apparatus.

Generally, in the conventional picture drawing apparatus, however, once a drawing has been drawn, it is difficult to modify the drawing. In particular, it is difficult to change drawings such as a map and a flow chart because they include a number of lines.

Figure 8B:
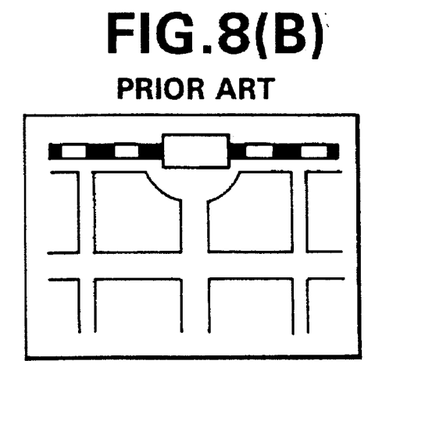
Figure 8C:
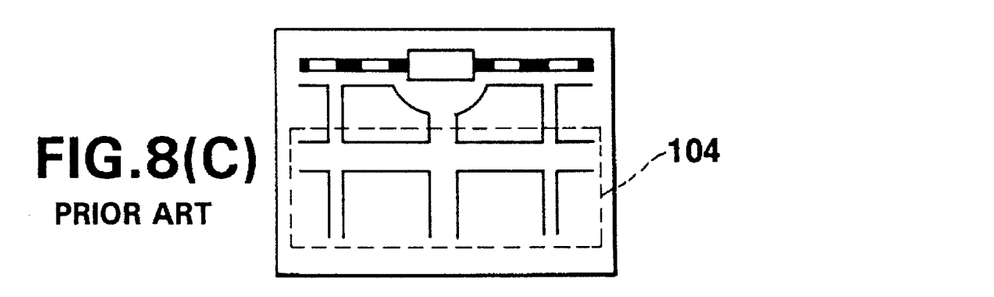
Figure 8D:
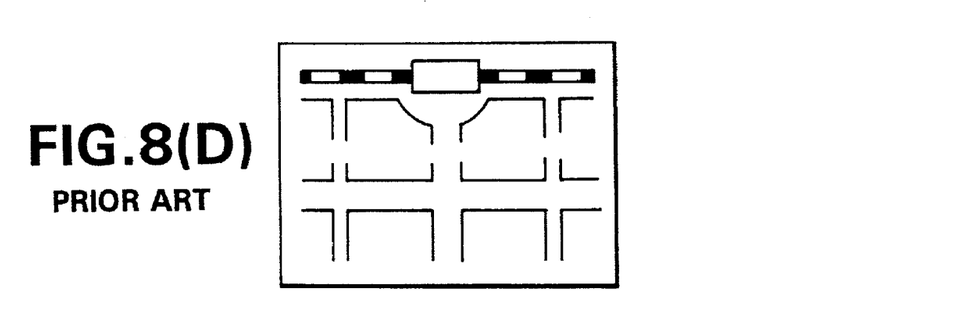
Figure 8E:
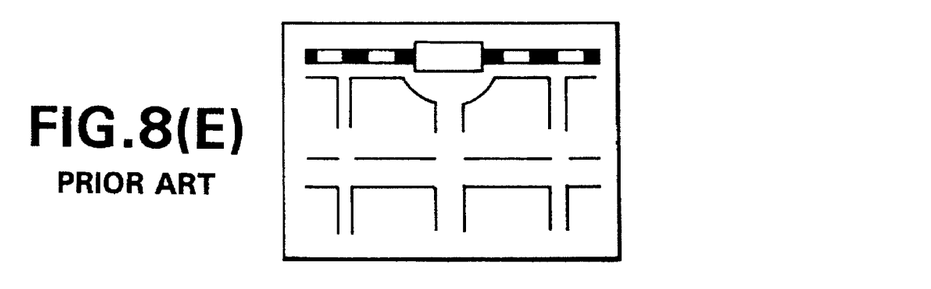

For example, assume that, while drawing a map including a station 100 and a street 102 as shown in FIG. 8(A), an operator wants to change the map so as to draw the street 102 far apart from the station 100 as shown in FIG. 8(B). In this case, moving an area of the map surrounded by a broken line 104 to an appropriate location, the operator can obtain his (or her) desired map. But, in the conventional picture drawing apparatus, many lines which cross the broken line 104 may be left broken in the resultant map as shown in FIGS. 8(D) and 8(E). As a result, the operator is required to do a time consuming work to connect these broken lines.

SUMMARY OF THE INVENTION

The features of the present invention are as follows: A drawing comprised of a number of drawing elements is displayed on a display unit. At a specifying step, an editing area which defines drawing elements to be edited is specified on the display unit and further a moving distance along which the drawing elements defined by the editing area are moved on the display unit is specified. At a moving step, the specified drawing elements which locate inside the specified editing area are moved on the display unit from original locations to other locations in accordance with the specified moving distance, respectively. At a modifying step, the drawing element which crosses a boundary of the specified editing area is modified in accordance with the specified moving distance.

As described above, even after a drawing has been drawn once, the drawing can be amended such that even drawing elements which cross the boundary of the specified editing area are not broken. Therefore, amendment to the drawing can be made with ease and a drawing operation may be performed pleasantly and efficiently.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIGS. 1–7 are views illustrating embodiments of the present invention and FIG. 8 is a view showing prior art.

DESCRIPTION OF THE PREFERRED EMBODIMENTS

Preferred embodiments of the present invention will be described with reference to the accompanying drawings.

Figure 1:
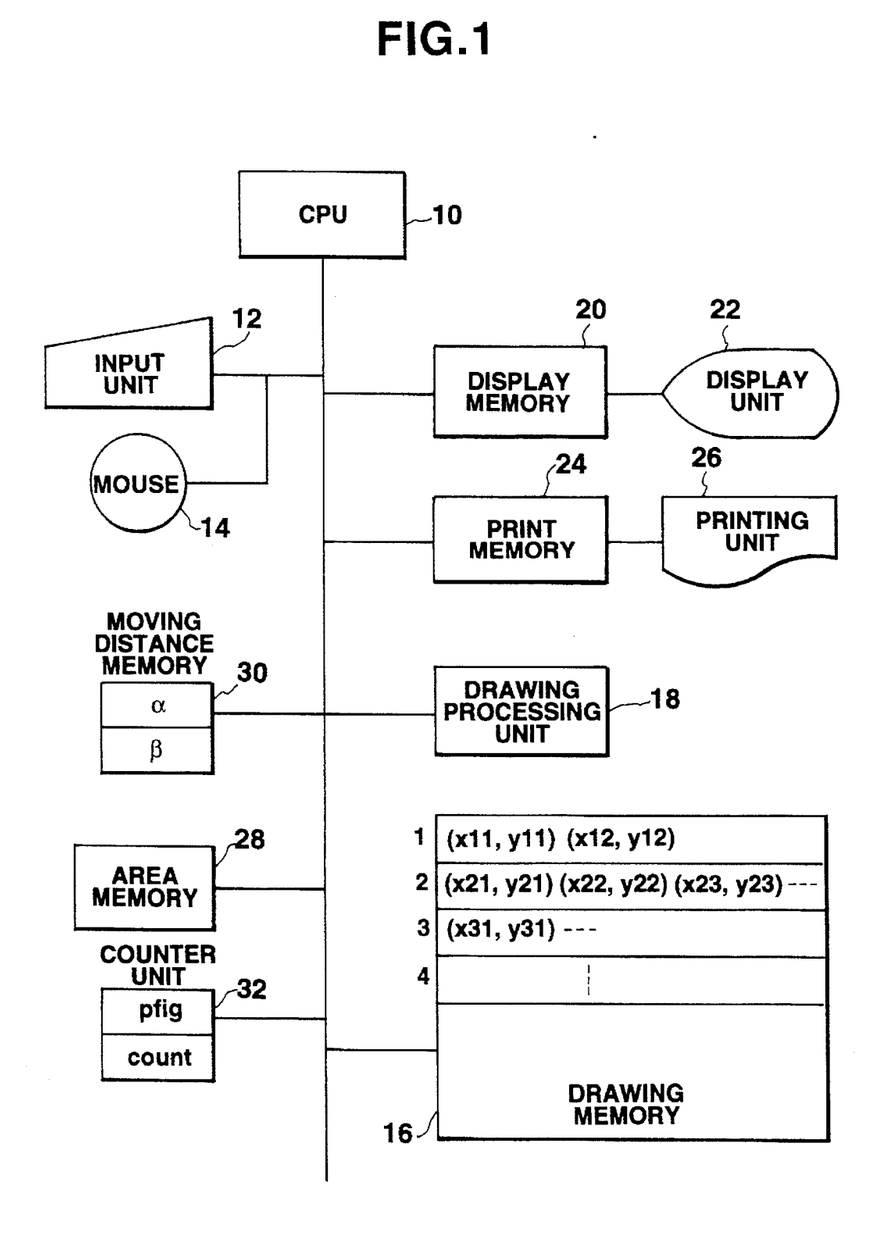
FIG. 1 is a block diagram of a first embodiment of the present invention.

FIG. 1 is a block diagram of a first embodiment of a drawing editing apparatus according to the present invention. In FIG. 1, a reference numeral 10 stands for a central processing unit (CPU), which controls the whole operation of the drawing editing apparatus. A reference numeral 12 represents an input unit including a key board which is provided with an execution key, a cursor key and other function keys. A reference numeral 14 stands for a mouse, and a reference numeral 16 represents a drawing memory which stores drawing data produced by the operator. The drawing data is stored in the drawing memory in the form of a vector. The drawing data comprises a collection of "a line connecting coordinates (x11, y11) and (x12, y12)", "a circle having a radius r and a center coordinates (x31, y31)", etc.

A reference numeral 18 stands for a drawing processing unit for converting drawing data stored in the drawing memory 16 into a drawing image. A reference numeral 20 is a display memory which stores a dot pattern corresponding to the drawing image produced by the drawing processing unit 18 to display the drawing image on a display unit 22. A reference numeral 24 represents a print memory which stores the drawing image produced by the drawing processing unit 18 to print the drawing image by means of a printing unit 26.

A reference numeral 28 stands for an area memory which stores coordinates that specify an editing area designated by the input unit 12 or the mouse 14. A reference numeral 30 represents a moving distance memory which stores a relative moving distance along which the specified editing area is moved. A reference numeral 32 is a counter unit including a drawing address counter Pfig and a drawing number counter Count.

Figure 2:
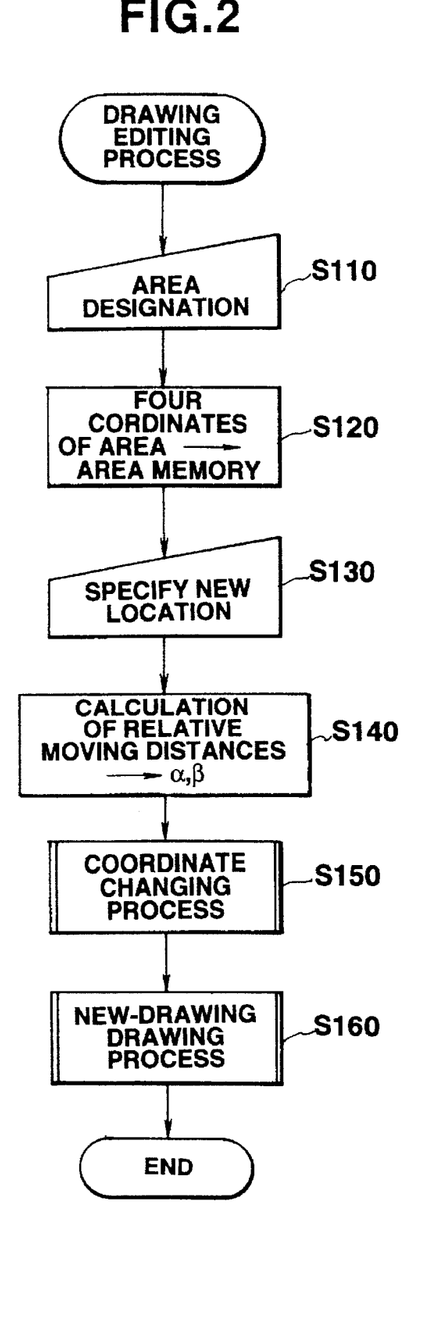
FIG. 2 is a flow chart of operation of the first embodiment of the invention.

Now, an operation of the drawing editing apparatus having the above mentioned structure will be described with reference to a flow chart of FIG. 2.

Figure 3A:
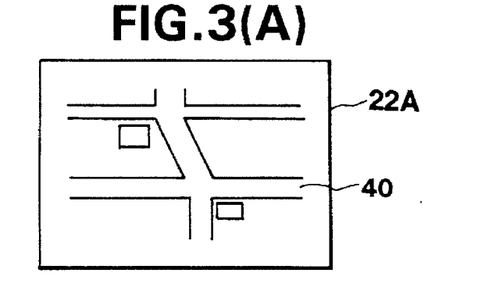
FIGS. 3(A)–3(D) are views showing indications displayed on a display unit for illustrating an editing operation of the first embodiment.

A drawing (a map) in the process of an editing operation is displayed, as shown in FIG. 3(A), in an editing indication 22A on the display unit 22 in accordance with drawing data stored in the drawing memory 16. The operator tries to change a location of a street 40 on the displayed map. For the sake of simplicity of the description, it is assumed that the drawing data stored in the drawing memory 16 is data of an indication of the editing indication 22A displayed on the display unit 22.

Figure 3B:
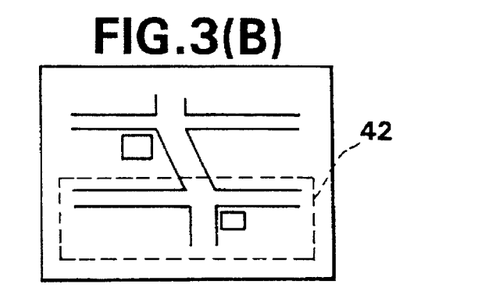

A rectangular area in the drawing to be moved (an area surrounded by a broken line 42 in FIG. 3(B)) is designated by the input unit 12 or the mouse 14 at step S110. Then, coordinates of four corners of the designated rectangular area 42 are stored in the area memory 28 at step S120. In this state, drawing elements of the drawing which located inside the area 42 are to be moved, and further drawing elements, line ends a and b of which fall within the area 42 (refer to FIG. 3(C)) are designated as those to be moved.

A location to which the designated drawing elements of the drawing are moved is specified by the input unit 12 or the mouse 14 at step S130. Then, relative moving distances α, β along which the designated drawing elements are moved from the original locations to desired locations are calculated and stored in the moving distance memory 30 at step S140.

A coordinate changing process is executed using data stored in the area memory 28 and the moving distance memory 30 to obtain new drawing data. The newly obtained drawing data are stored in the drawing memory 16 at step S150. The drawing processing unit 18 draws a new drawing corresponding to the newly obtained drawing data at step S160, as shown in FIG. 3(D).

Figure 4:
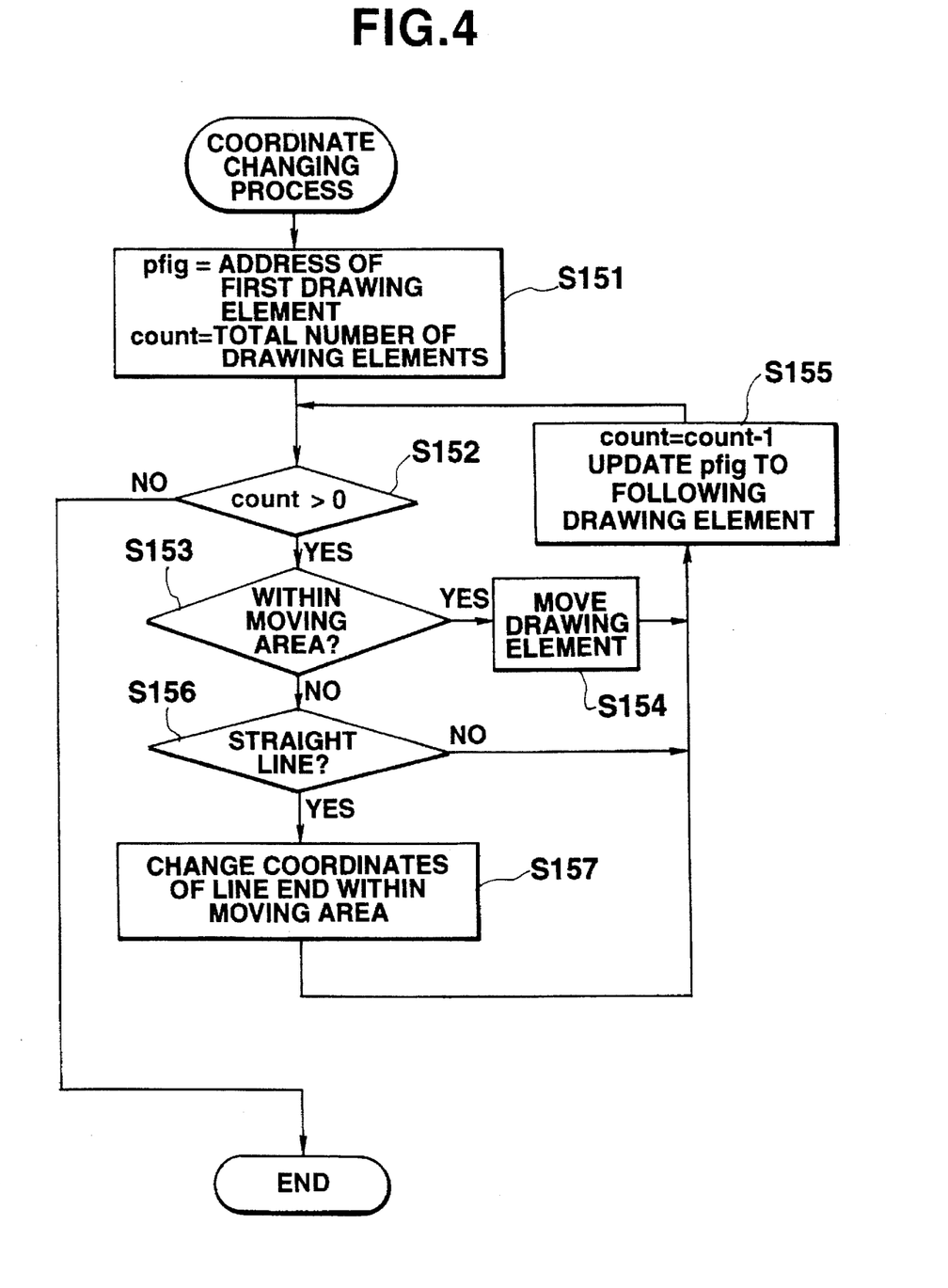
FIG. 4 is a flow chart of a detailed operation of a coordinate changing process shown in FIG. 2.

The above coordinate changing process is executed at step S150 in accordance with the flow chart of FIG. 4.

At step S151, an address which designates first drawing data among the drawing data stored in the drawing memory 16 is set to the drawing address counter Pfig of the counter unit 32 and further the total number of drawings stored in the drawing memory 16 is set to the drawing number counter Count.

It is judged at step S152 whether the value of the drawing number counter Count has reached "0", i.e., it is judged whether all the drawing data have been processed. If it is determined that the value of the counter has reached "0", the coordinate changing process is finished. If it is determined that the value of the counter has not reached "0", the coordinates stored in the area memory 28 are judged at step S153 to determine whether the drawing data which is designated by the address stored in the drawing address counter Pfig located completely inside the area 42. When it is determined that the drawing data located inside the area 42, the coordinates of the drawing data are changed in accordance with the relative moving distances α and β stored in the moving distance memory 30, and are written over the address of the drawing address counter Pfig at step S154. Thereafter, the value of the drawing number counter Count is decremented, and the values of the drawing address counter Pfig is updated to an address for designating the following drawing data at step S155, and then the processes of step S152 to step S155 are repeatedly executed.

Figure 3C:
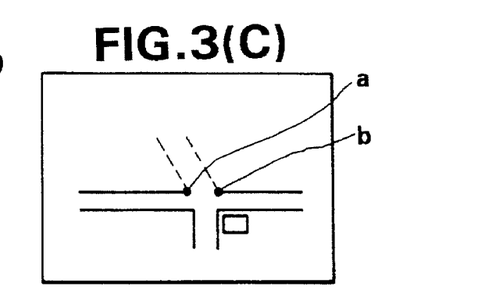
Figure 3D:
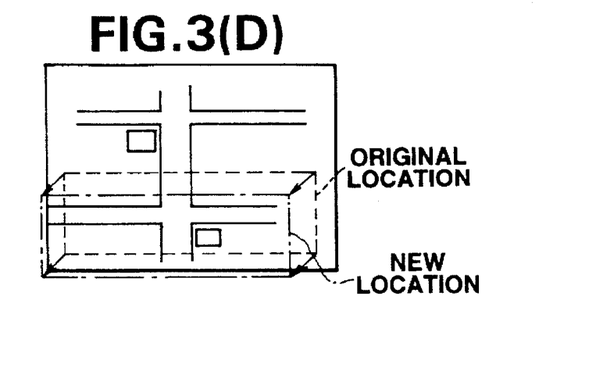

When it is determined that the drawing data located outside the area 42, it is judged at step S156 whether the drawing data is representative of a straight line and whether a line end of the straight line located inside the area 42 Just like a line end a or b located inside the area 42, as shown in FIG. 3(C). If not, the operation goes to step S155. If one of the line ends of the straight line located inside the area 42, the coordinates of the line end are changed in accordance with the relative moving distances α and β stored in the moving distance memory 30, and are written over the addresses set in the drawing address counter Pfig of the drawing memory 16 at step S157.

In the above coordinates changing process, it is judged whether each of the drawing elements of the drawing displayed on the display unit 22 located inside or outside the area 42. If it is determined that the drawing element located inside the area 42, the data of the drawing element is subjected to a moving process. If it is determined that the drawing element located outside the area 42 and the drawing element consists of a straight line, it is judged whether the line end of the straight line located inside the area 42. When the line ends of the straight lines located inside the area 42, the coordinates of such line ends are amended.

As described above, if a line end of a straight line of the drawing element of the drawing falls within the moving area 42, i.e., if the straight line crosses the boundary line of the moving area 42, the coordinates of the line end of the straight line within the moving area are automatically amended so that even if the drawing is amended, the straight line is not broken as shown in FIG. 3(D).

Now, a second embodiment of the present invention will be described.

The second embodiment of the present invention is different only in operation from the first embodiment described above. Therefore, only the operation of the second embodiment will be described in accordance with the flow chart of FIG. 5.

Figures 5, 6A, 6B, 6C, 6D:
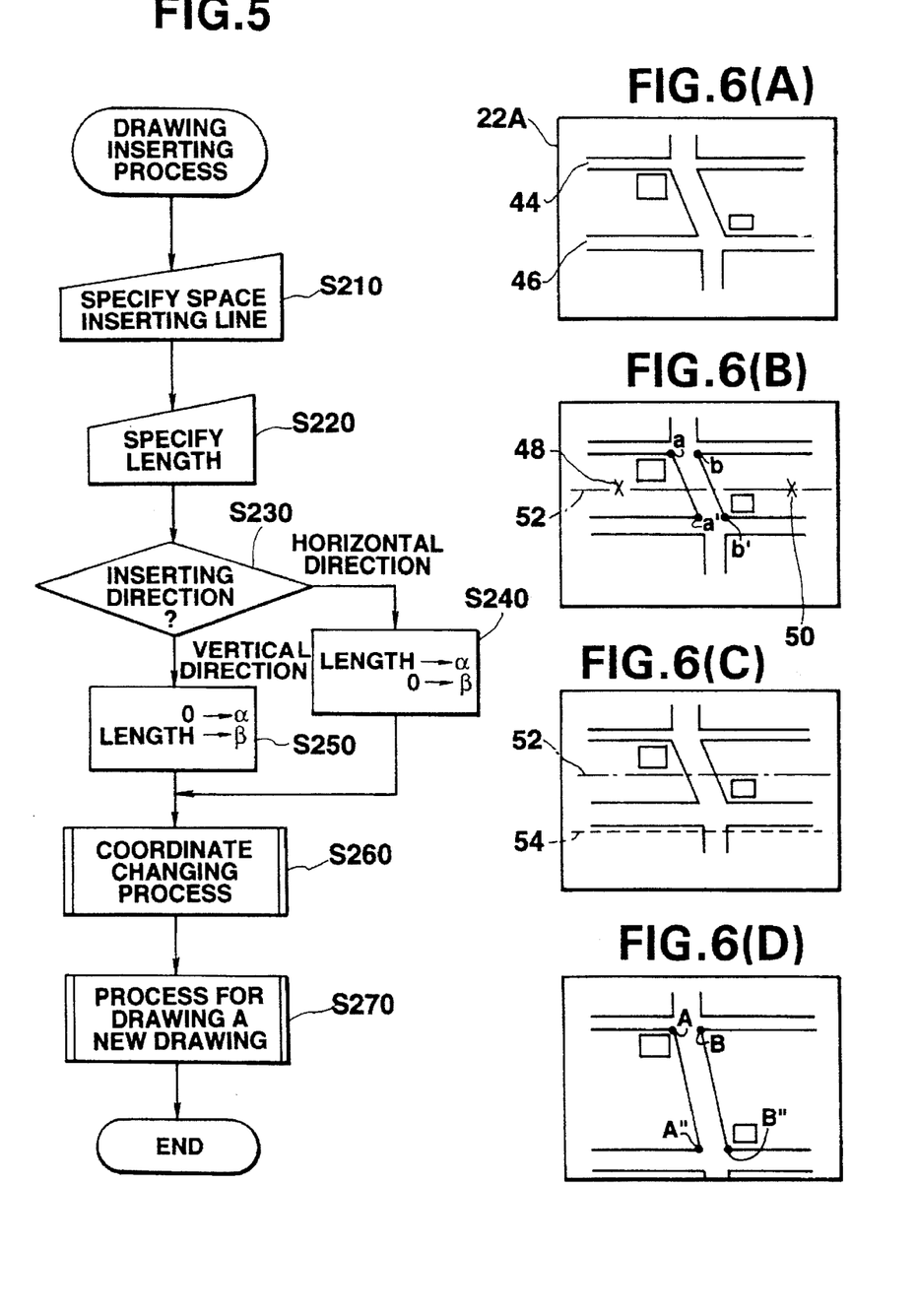
FIG. 5 is a flow chart of an operation of a drawing-element inserting process of a second embodiment of the present invention.
FIGS. 6(A)–6(D) are views showing indications displayed on the display unit for illustrating an editing operation of the second embodiment.

A drawing (a map) in process of an editing operation is displayed, as shown in FIG. 6(A), in the editing indication 22A on the display unit 22 in accordance with drawing data stored in the drawing memory 16. The operator tries to modify the drawing and executes a space inserting process to draw a street 46 far apart from a street 44 on the displayed map. For the sake of simplicity of the description, it is assumed that the drawing data stored in the drawing memory 16 is data of the indication 1 of the editing indication 22A displayed on the display unit 22.

At first, the function key of the input unit 12 is operated to set a spacing mode. Then, a portion in the map where a great deal of space is put between the streets 44 and 46 is designated by the mouse 14 at step S210. The portion is designated by means of a straight line (a space inserting line) 52 passing through two points (x and x) 48 and 50 as shown in FIG. 6(B). The coordinates of the designated portion are stored in the area memory 28.

A length of the space to be inserted between the streets 44 and 46 and on which side of the space inserting line 52 the space is to be put are designated by a space/side indicating line 54, as shown in FIG. 6(C), at step S220. It is determined depending on locations of the space inserting line 52 and the space/side indicating line 54, on which side of the space inserting line the space should be put.

If the space is put in the drawing in the horizontal direction (step S230), the designated length of the space is stored in the relative moving distance α of the moving distance memory 30 and a value "0" is set to the relative moving distance β at step S240. Meanwhile, if the space is put in the vertical direction (step S240), the designated length of the space is stored in the relative moving distance β of the moving distance memory 30 and a value "0" is set to the relative moving distance α at step S250.

Based on data stored in the area memory 28 and the moving distance memory 30, the coordinate changing process is executed on the drawing data to obtain new drawing data. The new drawing data thus obtained are stored in the drawing memory 16 at step S260. The drawing processing unit 18 draws a new drawing on the display unit 22 using the new drawing data at step S270. The new drawing thus obtained is shown in FIG. 6(D), in which the space is inserted and straight lines a-a' and b-b' (FIG. 6(B)) crossing the space inserting line 52 are replaced with straight lines A-A" and B-B" (FIG. 6(D)), respectively.

Figure 7:
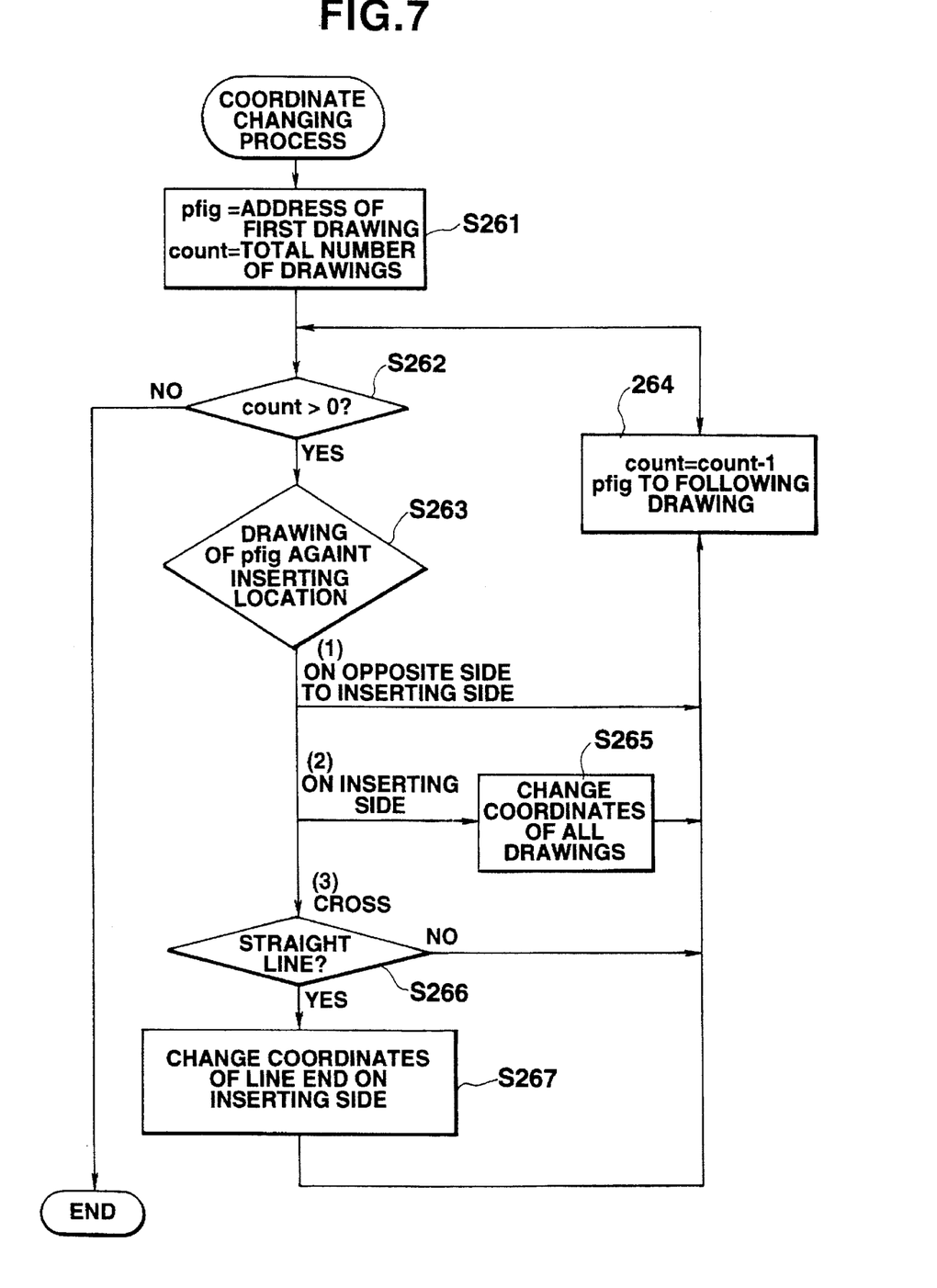
FIG. 7 is a flow chart of a detailed operation of a coordinate changing process shown in FIG. 5.

The coordinate changing process of step S260 will be executed in accordance with a flow chart of FIG. 7.

More specifically, an address which designates the first drawing data among the drawing data stored in the drawing memory 16 is set to the drawing address counter Pfig of the counter unit 32, and the total number of the drawings stored in the drawing memory 16 is set to the drawing number counter Count at step S261.

It is judged at step S262 whether a value of the drawing number counter Count has reached "0", i.e., whether all the drawing data have been processed. When it is determined that the value of the counter has reached "0", the coordinate changing process is finished. When it is determined that the value of the counter has not reached "0, the relationship in location between the space inserting line stored in the area memory 28 and the drawing data designated by the drawing address counter Pfig is judged at step S263.

When the drawing element located outside the moving area, the drawing element is not modified but the value of the drawing number counter Count is decremented and the address of the drawing address counter Pfig is updated to an address that designates the following drawing data, at step 264. Then, processes at steps 262 to 264 are performed again.

Meanwhile, when the drawing element located inside the moving area, the drawing element is moved by the moving distance in the inserting direction at step S265. More specifically, the coordinates of the drawing data are changed in accordance with the relative moving distances α and β stored in the moving distance memory 30, and are written over the address of the drawing address counter Pfig at step S265. Thereafter, the operation goes to step S264 to prepare for processing the following drawing data.

When the drawing element crosses the space inserting line 52, it is judged at step S266 whether the drawing element is a straight line. When the drawing element is not a straight line, the drawing element is not modified and the operation goes to step S264 to prepare for processing the following drawing data.

When the drawing element is a straight line, only the line end of the straight line within the moving area is moved in the inserting direction at step S267. More specifically, the coordinates of the line end of the straight line are changed in accordance with the relative moving distances α and β stored in the moving distance memory 30, and are written over the address of the drawing address counter Pfig at step S267.

In the above coordinates changing process, it is judged whether each of drawing elements of the drawing displayed on the display unit 22 located inside or outside the area 42. If it is determined that the drawing element located inside the area 42, the data of the drawing element is subjected to a moving process. If it is determined that the drawing element located outside the area 42 and the drawing element consists of a straight line, it is judged whether the line end of the straight line located inside the area 42. When the line ends of the straight lines located inside the area 42, the coordinates of such line end are amended.

As described above, if a line end of a straight line of the drawing element of the drawing falls within the moving area 42, i.e., if the straight line crosses the boundary line of the moving area 42, the coordinates of the line end of the straight line within the moving area are automatically amended so that even if the drawing is amended, the straight line is not broken as shown in FIG. 6(D).

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A method of editing a drawing displayed on a display unit, comprising the steps of:
   (1) displaying a drawing on said display unit, the drawing including a plurality of drawing elements each drawn between two coordinates on said display unit;
   (2) specifying an editing area of the drawing displayed on said display unit with a boundary line, said specified editing area including therein a plurality of drawing elements of the drawing which are to be moved on said display unit;
   (3) specifying a moving distance and a moving direction;
   (4) detecting all drawing elements which are drawn within said specified editing area and all drawing elements which are drawn across the boundary line of said specified editing area, the detected drawing elements which are drawn across the boundary line each having one end point outside said specified editing area and another end point inside said specified editing area;
   (5) changing, based on the specified moving distance and the specified moving direction, the coordinates of the detected drawing elements drawn within said specified editing area and the coordinates of the another end points of the detected drawing elements inside said specified editing area; and
   (6) based on said specifying step (3), redrawing all of the detected drawing elements originally drawn across the boundary line of the specified editing area between the original coordinates of the one end points outside said specified editing area and the changed coordinates of the another end points originally inside said specified editing area, and redrawing all of the detected drawing elements originally drawn within said specified editing area between the changed coordinates thereof.

2. The method in accordance with claim 1, wherein said specified editing area is rectangular.

3. The method in accordance with claim 1, wherein the step (2) of specifying said editing area comprises a step of dividing the drawing displayed on said display unit into two areas with a boundary line oriented in at least one of a vertical and a horizontal direction.

4. The method in accordance with claim 1, wherein said plurality of drawing elements included in said specified editing area are moved together while maintaining an original relationship in their layout.

5. A method of editing a drawing displayed on a display unit, comprising the steps of:

(1) displaying a drawing on said display unit, the drawing including a plurality of drawing elements, each drawn between two coordinates in an X-Y coordinate system on said display unit;

(2) specifying an editing area of the drawing displayed on said display unit with a boundary line, said specified editing area including therein a plurality of drawing elements of the drawing which are to be moved on said display unit;

(3) specifying a display location on said display unit where said plurality of drawing elements included in said specified editing area are to be moved;

(4) calculating from the specified editing area and the specified display location a moving distance in the X-direction of the X-Y coordinate system and a moving distance in the Y-direction of the X-Y coordinate system by which the drawing elements in said specified editing area are to be moved;

(5) detecting all drawing elements which are drawn within said specified editing area and all drawing elements which are drawn across the boundary line of said specified editing area, the detected drawing elements which are drawn across the boundary line each having one end point outside said specified editing area and another end point inside said specified editing area;

(6) changing, by said calculated moving distance in the X-direction and by said calculated distance in the Y-direction, the coordinates of the detected drawing elements drawn within said specified editing area and the coordinates of the another end points of the detected drawing elements inside said specified editing area on said display unit; and (7) based on said specifying steps (2) and (3), redrawing the detected drawing elements originally drawn across the boundary line of said specified editing area between the original coordinates of the one end points outside said specified editing area and the changed coordinates of the another end points originally inside said specified editing area, and redrawing the detected drawing elements originally drawn within said specified editing area between the changed coordinates thereof.

6. The method in accordance with claim 5, wherein said specified editing area is rectangular.

7. The method in accordance with claim 5, wherein the step (2) of specifying said editing area comprises a step of dividing the drawing displayed on said display unit into two areas with a boundary line oriented in at least one of a vertical and a horizontal direction.

8. The method in accordance with claim 5, wherein said plurality of drawing elements included in said specified editing area are moved together while maintaining an original relationship in their layout.

9. A method of editing a drawing displayed on a display unit, comprising the steps of:

(1) displaying a drawing on said display unit, the drawing including a plurality of drawing elements, each drawn between two coordinates on said display unit;

(2) dividing the drawing displayed on said display unit into two areas with a first line;

(3) specifying a second line parallel with the first line in one of said two areas of the drawing to select said one of said two areas as an editing area, in which a plurality of drawing elements of the displayed drawing to be moved are included;

(4) detecting all drawing elements which are drawn within said defined editing area and all drawing elements which are drawn across the first line in the drawing, the detected drawing elements which are drawn across the first line each having one end point which is outside said defined editing area and another end point which is inside said defined editing area;

(5) changing the coordinates of the detected drawing elements drawn within said defined editing area and the coordinates of the another end points of the detected drawing elements drawn across the first line, by a distance between the first and the second line in a direction from the first line to the second line; and (6) based on said specifying step (3), redrawing the detected drawing elements originally drawn across the first line between the original coordinates of the one end points outside the defined editing area and the changed coordinates of the another end points originally inside said defined editing area, and redrawing the detected drawing elements originally drawn within the defined editing area between the changed coordinates thereof.

10. The method in accordance with claim 9, wherein the first line in said step (2) is a straight line oriented in one of a vertical and a horizontal direction.

11. The method in accordance with claim 9, wherein said plurality of drawing elements included in the defined editing area are moved together while maintaining an original relationship in their layout.

* * * * *